United States Patent [19]

Seed et al.

[11] 4,172,010

[45] Oct. 23, 1979

[54] LIQUID METAL COOLED NUCLEAR REACTOR CONSTRUCTIONS

[75] Inventors: Geoffrey Seed, St. Helens; Donald Hodgson, Ormskirk; Colin J. Grime, Warrington, all of England

[73] Assignee: Nuclear Power Company Limited, London, England

[21] Appl. No.: 824,235

[22] Filed: Aug. 12, 1977

[30] Foreign Application Priority Data

Aug. 12, 1976 [GB] United Kingdom .............. 33675/76

[51] Int. Cl.² ........................................... G21C 13/00
[52] U.S. Cl. ....................................... 176/87; 176/40; 176/65
[58] Field of Search ............................. 176/40, 65, 87

[56] References Cited

U.S. PATENT DOCUMENTS

| | | | |
|---|---|---|---|
| 3,821,079 | 6/1974 | Jabsen | 176/87 X |
| 3,937,653 | 2/1976 | Leheu | 176/65 X |
| 3,962,032 | 6/1976 | Berniolles et al. | 176/40 X |
| 4,001,079 | 1/1977 | Rylatt | 176/87 |
| 4,043,867 | 8/1977 | Benque et al. | 176/87 X |
| 4,056,438 | 11/1977 | Gama et al. | 176/65 X |

Primary Examiner—Peter A. Nelson
Attorney, Agent, or Firm—Larson, Taylor and Hinds

[57] ABSTRACT

The fuel assembly in a nuclear reactor construction is supported from the wall of a primary vessel on a strongback and there is secondary support means for the fuel assembly the means comprising a secondary strongback supported from the roof structure of a containment vault by ties. The secondary support means provides a safety device whereby in the event of relaxation of the primary support relative movement between the fuel assembly and control rods is limited. Alternative secondary support means comprise a series of ties supporting the diagrid and a support stool beneath the fuel assembly.

7 Claims, 3 Drawing Figures

4,172,010

LIQUID METAL COOLED NUCLEAR REACTOR CONSTRUCTIONS

BACKGROUND OF THE INVENTION

This invention relates to liquid metal cooled nuclear reactor constructions.

In one well known example of liquid metal cooled nuclear reactor construction the reactor is submerged in a pool of coolant contained in a primary vessel. The primary vessel is housed in a concrete containment vault and is suspended from the roof of the vault. The core is carried on a diagrid which is suspended from the roof of the vault by tie rods and the roof carries control rods which are vertically insertable in the core to control reactivity. In the event of displacement of the core relative to the control rods during operation of the reactor core the resultant change of reactivity could have serious consequences and it is an object of the present invention to provide a construction of liquid metal cooled nuclear reactor having means for limiting uncontrolled displacement of the core relative to the control rods.

SUMMARY OF THE INVENTION

According to the invention in a liquid metal cooled nuclear reactor construction comprising a reactor core submerged in a pool of coolant in a primary vessel which is suspended from the roof structure of a containment vault and control rods supported from the roof structure and insertable in the core, the reactor core is carried from the wall of the primary vessel on a strongback and there is secondary support means for the reactor core for use in the event of sag of the strongback. In the event of failure or partial failure of the strongback or its support consequent downward displacement of the reactor core relative to the control rods is safely limited by the secondary support means.

DESCRIPTION OF THE DRAWINGS

Three alternative constructions of liquid metal cooled nuclear reactor embodying the invention are described with reference to the accompanying drawings FIGS. 1, 2 and 3 which are diagrammatic sectional views.

DESCRIPTION OF THE PREFERRED EMBODIMENT

Figure 1:
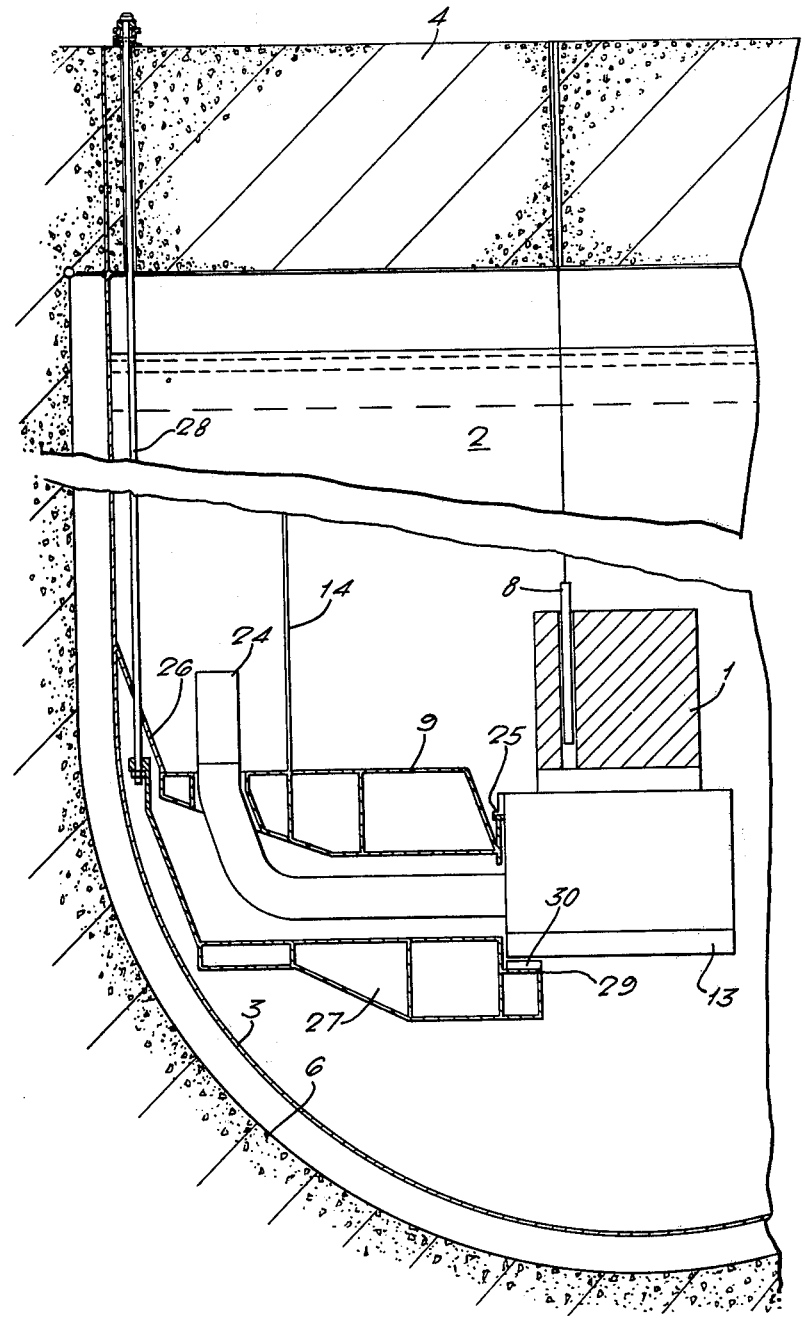

In the construction shown in FIG. 1 the reactor core 1 is submerged in a pool 2 of liquid sodium in a primary vessel 3. The primary vessel is suspended from the roof structure 4 of a containment vault the rim of the primary vessel being sealed to the roof structure in order to contain an inert cover gas for the pool of coolant. A plurality of control rods 8 (only one being shown in the drawing) is supported by the roof structure of the vault and the rods are insertable in the core to control reactivity. The reactor core carried on a diagrid 13, is supported on an annular strongback 9 by means of a peripheral flange 25 of the core and the strongback is carried from the wall of the primary vessel by means of an internal skirt 26 of the vessel 3. Secondary support means for the reactor core comprises a second strongback 27 disposed beneath the core and suspended from the roof structure of the vault by tie rods 28 the second strongback having an annular abutment shoulder 29 for receiving the peripheral base region of the diagrid 13. A crushable packer 30 is positioned between the abutment shoulder and the core and is arranged to collapse when a compressive load is put upon it. The arrangement is such that downward displacement of the core relative to the control rods, such as may be caused by failure or partial failure of the skirt 26 or diagrid 9, is limited by the shoulder 29 and thereby avoids serious reactivity instability. The permitted displacement of the core relative to the control rods due to sag of the strongback may be adjustable by interposing jacking means between the upper ends of the ties and the roof structure of the vault.

In more detail, the nuclear reactor core 1 is a fast breeder nuclear reactor comprising a plurality of upstanding fuel element assemblies arranged side-by-side on the diagrid 13. The core is surrounded by a shroud 14 or core tank and pumps and heat exchangers (not shown in the drawing) supported by the roof of the vault and are immersed in the pool 2 of coolant.

The pumps are arranged to deliver coolant drawn from the outer regions of the pool to the core by way of pipes 24 (only one being shown in FIG. 1) and the diagrid 13. The coolant is heated in passage through the core and flows upwardly through the shroud 14 thence outwardly to the heat exchangers subsequently being returned to the pool.

Figure 2:
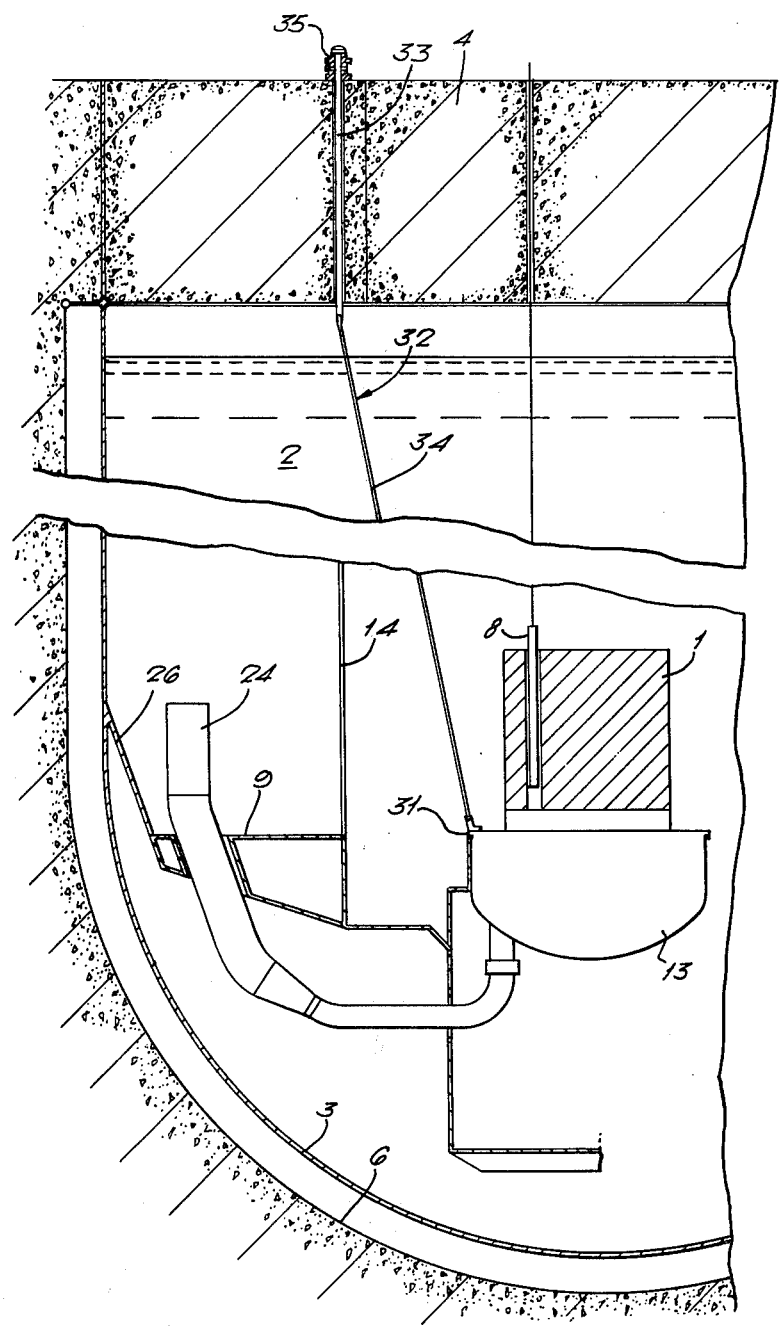

In FIG. 2 there is shown a construction of liquid metal cooled fast breeder nuclear reactor which is generally similar to that shown in FIG. 1 but wherein the secondary support means for the reactor core is of different construction. In the construction shown in FIG. 2 the core 1 is mounted on a diagrid 13 having a flange 31 which sealingly abuts an annular strongback 9. The strongback is carried from the primary vessel wall by an internal skirt 26.

The secondary support means for the core comprises an annular series of ties 32 arranged about the periphery of the diagrid and supported by the roof structure of the vault. The ties each comprise a tie rod 33 passing vertically through the roof structure and extended downwardly by a strap 34. Jacking means 35 is provided whereby the ties can be pretensioned. In the event of sag of the strongback the load of the reactor core is taken up partially or entirely by the ties thereby avoiding excessive displacement of the reactor core relative to the control rods.

Figure 3:
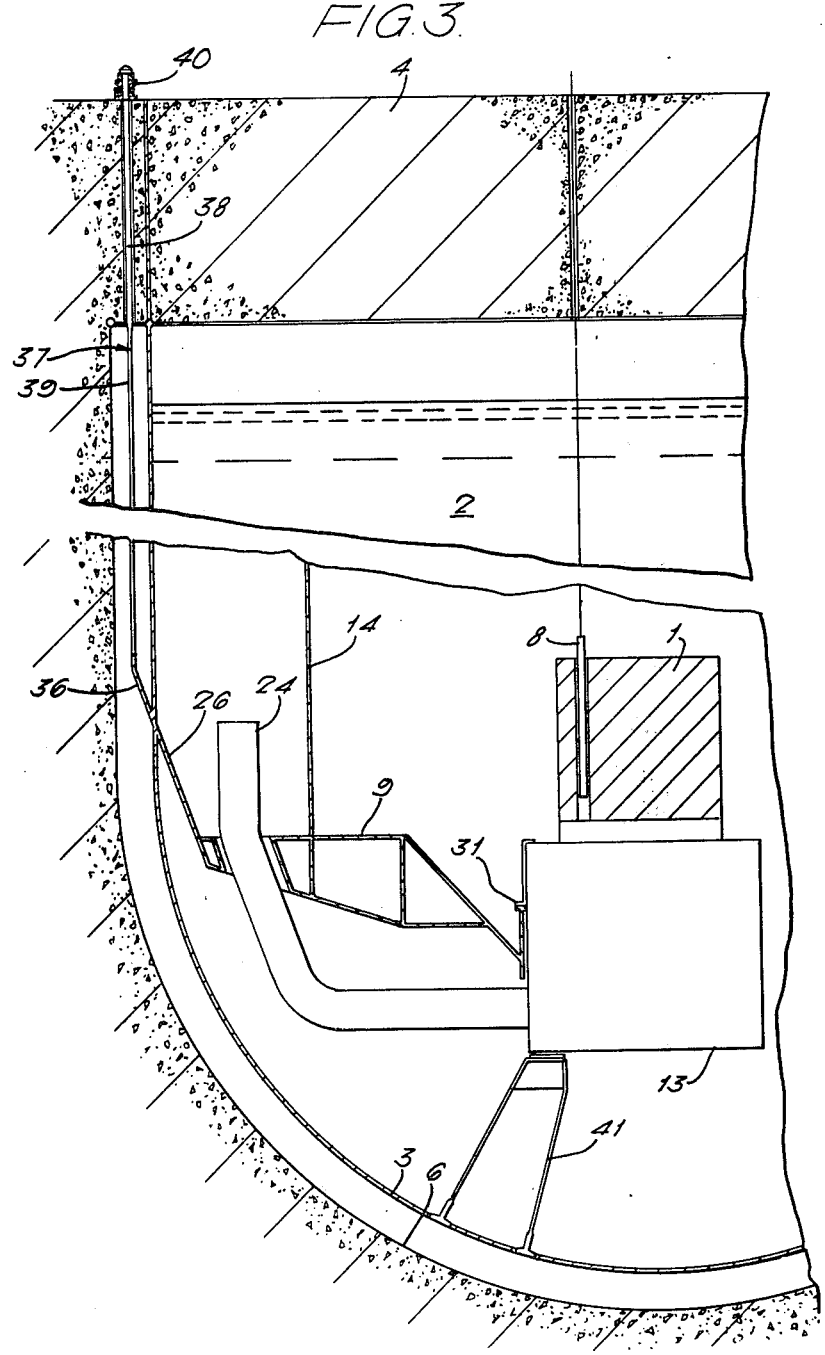

In the construction shown in FIG. 3 the reactor core is again mounted on a diagrid 13 which has a peripheral flange 31 in sealed abutment with an annular strongback 9 by which the core is carried from the inner wall of the primary vessel. The strongback is secured to the primary vessel by means of an annular skirt 26. The secondary support means for the reactor core in the event of sag of the strongback comprises an annular stool 41 welded to the base of the primary vessel and disposed immediately below the peripheral region of the diagrid 13. There is a crushable packer interposed between the diagrid 13 and the stool 41 arranged so that in the event of sag of the strongback downward displacement of the core and diagrid relative to the control rods is limited. The primary vessel has an outer inverted skirt 36 which forms a radial extension of the inner skirt 26 and the outer skirt is secured to the roof structure of the vault by means of an annular series of ties 37. The ties each comprise an upper rod 38 and a flexible strap 39, the straps being welded to the outer skirt 36. The upper ends of the rods 38 are attached to the roof structure 4 through jacking means 40. The ties may be pretensioned so that they share the load of the core and strongback with the upper wall regions of the primary vessel.

We claim:

1. In a liquid metal cooled nuclear reactor construction comprising:
   a primary vessel housed within a concrete containment vault, the primary vessel being suspended from the roof structure of the vault,
   a reactor fuel assembly submerged in a pool of coolant contained by the primary vessel,
   support means for the fuel assembly comprising a strongback carried from the wall of the primary vessel,
   a plurality of control rods supported from the roof structure and insertable in the fuel assembly, the improvement which comprises secondary support means for the fuel assembly, the secondary support means being generally unloaded during normal operation of the nuclear reactor construction but capable of carrying the fuel weight of the fuel assembly in the event of sag of said strongback.

2. A liquid metal cooled nuclear reactor construction according to claim 1 wherein said fuel assembly is carried on a diagrid and wherein said secondary support means for the reactor fuel assembly comprises a second strongback disposed beneath the fuel assembly and suspended from the roof structure by ties, said second strongback having an annular abutment shoulder for receiving the peripheral base regions of said diagrid.

3. A liquid metal cooled nuclear reactor construction according to claim 2 wherein the ties are attached to the roof structure of the vault through jacking means and wherein there is a crushable packer interposed between the secondary support and the diagrid.

4. A liquid metal cooled nuclear reactor construction according to claim 1 wherein said fuel assembly is carried on a diagrid and wherein said secondary support means for the reactor fuel assembly comprises an annular series of ties arranged about the periphery of said diagrid, the ties being supported by the roof structure of the vault.

5. A liquid metal cooled nuclear reactor construction according to claim 4 wherein the ties are attached to the roof structure of the vault through jacking means.

6. A liquid metal cooled nuclear reactor construction according to claim 1 wherein said fuel assembly is carried on a diagrid and wherein said secondary support means for the reactor core comprises an annular stool secured internally to the base of the primary vessel and disposed immediately below the peripheral region of said diagrid and there is an annular series of ties disposed outside the primary vessel and supported from the roof structure to provide supplementary support for the strongback.

7. A liquid metal cooled nuclear reactor construction according to claim 6 wherein the ties are attached to the roof structure of the vault through jacking means and wherein there is a crushable packer interposed between the secondary support means and the diagrid.